United States Patent
Shmunk

(10) Patent No.: US 10,437,029 B2
(45) Date of Patent: Oct. 8, 2019

(54) COLLAPSIBLE LENS MOUNT SYSTEMS

(71) Applicant: Almalence Inc., Novosibirsk (RU)

(72) Inventor: Dmitry Valerievich Shmunk, Novosibirsk (RU)

(73) Assignee: ALMALENCE INC., Austin, TX (US)

( * ) Notice: Subject to any disclaimer, the term of this patent is extended or adjusted under 35 U.S.C. 154(b) by 0 days.

(21) Appl. No.: 15/047,951

(22) Filed: Feb. 19, 2016

(65) Prior Publication Data
US 2018/0011302 A1    Jan. 11, 2018

(51) Int. Cl.
G02B 15/14 (2006.01)
G02B 7/10 (2006.01)
G03B 17/12 (2006.01)
G02B 13/12 (2006.01)
G02B 7/16 (2006.01)
G03B 17/04 (2006.01)

(52) U.S. Cl.
CPC ............ *G02B 15/14* (2013.01); *G02B 7/10* (2013.01); *G02B 7/16* (2013.01); *G02B 13/12* (2013.01); *G03B 17/04* (2013.01); *G03B 17/12* (2013.01); *G03B 2205/0092* (2013.01)

(58) Field of Classification Search
CPC .......... G02B 7/10; G02B 7/023; G02B 7/022; G02B 7/021; G02B 7/16; G02B 13/12; G02B 15/14; G02B 17/04; G02B 17/12; G03B 17/04; G03B 17/12; G03B 2205/0092
USPC .......................... 359/699, 701, 700, 703, 683
See application file for complete search history.

(56) References Cited

U.S. PATENT DOCUMENTS

| | | | |
|---|---|---|---|
| 7,079,761 B2 | 7/2006 | Nomura | |
| 7,194,203 B2 | 3/2007 | Omiya et al. | |
| 7,773,871 B2 | 8/2010 | Ishizuka | |
| 8,885,266 B2 | 11/2014 | Uno et al. | |
| 2002/0105731 A1* | 8/2002 | Iikawa | G02B 7/102 359/694 |

(Continued)

OTHER PUBLICATIONS

International Search Report for International Application No. PCT/US2017/014288; International Filing Date Jan. 20, 2017; dated Apr. 6, 2017; 2 pages.

(Continued)

*Primary Examiner* — Evan P Dzierzynski
*Assistant Examiner* — Mitchell T Oestreich
(74) *Attorney, Agent, or Firm* — Muncy, Geissler, Olds & Lowe, P.C.

(57) ABSTRACT

Systems are presented with special mechanical means to switch a set of lens elements to form a compound lens from a storage position to an imaging position. In the storage mode, these arrangements offer highly efficient space saving schemes suitable for use in application where space is a premium. In the imaging mode, a plurality of lens singlets are brought together on a common imagine axis whereby they operate to form very high quality images at a single image plane. Singlet lenses are held in a lens mount device of a disk element. A plurality of similar cooperating disk elements move against adjacent coupled disks to cause well-regulated desirable motion and positioning. Specifically, portions of the disk include a cam system which permits smooth movement as disk elements are counter rotated with respect to each other thus driving the preferred positioning.

12 Claims, 9 Drawing Sheets

(56) References Cited

U.S. PATENT DOCUMENTS

2014/0313377 A1    3/2014  Hampton
2016/0041453 A1    2/2016  Pizzo et al.

OTHER PUBLICATIONS

Written Opinion for International Application No. PCT/US2017/014288; International Filing Date Jan. 20, 2017; dated Apr. 6, 2017; 5 pages.

\* cited by examiner

COLLAPSIBLE LENS MOUNT SYSTEMS

BACKGROUND OF THE INVENTION

This patent application stands on its own as an original new and initial application for patent without continuation dependence from any other earlier filed applications.

Field

The following invention disclosure is generally concerned with optical imaging systems and specifically concerned with very compact optical imaging systems having integrated therewith a high performance collapsible function.

Related Systems

Imaging systems have been arranged to support improved imaging performance during use of a camera and improved portability when the camera is not being used in an active imaging mode—i.e. during transport.

In one example, the very well known and popular Nikon camera company uses a Nikon F-mount system on their single lens reflex cameras. While a primary purpose is for interchangeable lenses, the F-mount also, allows lenses to be removed from camera bodies for improved ease of transport. A camera body fits into a much smaller space when its lens has been removed. Accordingly, single lens reflex camera systems can be considered suitable for operation in two modes with an active imaging mode and a storage mode where the lens has been removed.

More commonly, camera systems that are suitable for non-professional consumers include those that might be characterized as 'point-and-shoot' cameras. These are particularly useful for tourists who often enjoy a much smaller and lighter camera package. Because the imaging requirements are less for tourists as compared to professionals, it is easier to arrange for good quality lenses without having to adopt very large glass optical systems. Further, these good quality lenses are additionally improved by use of a clever method of reducing their size when not in active use. That is, when not being used for imaging, the lens may be collapsed on its axis such that the lens elements from which it is comprised are stacked closely together without much space in between each element. When a user desires to deploy the lens into an imaging mode, the lens system is extended and automatic mechanical guides cause individual lens elements to align and become precisely spaced whereby very sharp images are realized at an image field detector or film plane. While the space consumed by the collapsed lens is small, the weight of the device remains the same.

These type of collapsing barrel lens systems are widely in use today on very small portable cameras. Invariably, these systems rely upon a collapsing action in the axial direction. This necessitates a limit with regard to the amount of space reduction. Since the thickness of each lenslet of a compound lens is stacked together, the overall thickness of the collapsed system can be no less than the sum of all lenslet thickness. This is true for all axially stacked devices. For systems which are critical with regard to thickness, these axially collapsing compound lenses are not always a suitable choice.

In one important application where axially collapsing lenses are not a good choice, cameras integrated with smartphone devices demand imaging systems which are very thin. Accordingly, smartphone devices tend to have very short focal length fixed lenses. These tend to be wide field-of-view arrangements without opportunity for user adjustment nor control. The fixed focal length tends to be highly restrictive leaving smartphone photographers little choice for imaging variance. Nevertheless, smartphone cameras do have very good optics that consume very little space—albeit with limitations.

Some clever artisans such as Hampton brought good efforts to improve the performance of mobile phone imagers in his teaching of US application 2014/0313377 published Oct. 23, 2014. This device is fastened to the external body of a smartphone to support improved imaging. When not being used as a camera, the more sophisticated extension lens may be decoupled and removed from the smartphone where it can be easily stored normally again.

The art is now replete with similar add-on lens devices which can be used to extend the imaging possibilities for smartphones. However use of these systems also come with significant drawbacks and shortcomings. Lens systems which add on to the external portion of a smartphone tend to not cooperate perfectly with the non-removable optics. Further, dirt tends to interrupt the optical path and easily collects in the system and is hard to clean. Removable lenses that are not integrated with the smartphone tend to be easily lost or forgotten and left behind. Other problems render these imperfect extensions less than ideal.

While systems and inventions of the art are designed to achieve particular goals and objectives, some of those being no less than remarkable, these inventions of the art have nevertheless include limitations which prevent uses in new ways now possible. Inventions of the art are not used and cannot be used to realize advantages and objectives of the teachings presented herefollowing.

SUMMARY OF THE INVENTION

Comes now, Dmitry Valerievich Shmunk with inventions of high performance lens systems including mechanical devices operable for establishing dual operational modes. Specifically, a high fidelity imaging mode is achieved in one positional arrangement and a space conservative and efficient storage mode is achieved in a second arrangement.

It is a primary function of these lens systems to provide imaging means for applications having very high quality imaging demands simultaneous with limited space and weight allocations. For example, mobile telephones and smartphones today typically include very high quality camera systems built into exceptionally thin and lightweight housings. However, those devices are presently constrained by limits (e.g. wide field of view, magnification) which are undesirable. Conversely, systems described herein this invention disclosure include very high performance compound lens systems which greatly outperform those commonly known static systems deployed in mobile phones and other space limited applications today.

This very high performance imaging is realized despite the fact that these systems may be deployed packages having very limited space constraints. This is achieved in part by arrangements which afford the lens system to switch between two operational modes including an imaging mode and a storage mode. When a compound lens as described herein is manipulated into an imaging mode, a high performance imager having excellent magnification, resolution and low distortion is possible. When switched back to a non-imaging or storage mode, the lens system consumes remarkably little space as it is collapsed into a form of a very thin planar volume.

In brief, a mechanical arrangement has been devised to hold a plurality of lens singlet elements from which a compound lens may be formed. This mechanical arrangement provides for a simple and smooth motion between two static or terminal positions including an imaging position and a storage position. When a set of specially formed coupled disk elements are rotated against each other, they operate to displace lenses held therein in a manner whereby they can be switched between imaging and storage configurations.

Users may easily operate the mechanism by applying gentile tactile force for example via pressure from a fingertip. Such pressure can be used to cause a collapse lens in a storage position to move to an extended arrangement necessary for imaging. After photographs or videos are made, the lens may be returned to storage by application of an opposite motion. In some versions, an electric drive system can be used to apply force which switches the mount between storage and imaging modes.

It is a contrast to prior art methods and devices that systems first presented here do not limit photography applications having space and weight constraints to wide field-of-view modest resolution imagers. Systems described here-following include those where very high performance imagers may be set into a compact storage configuration suitable for space limited devices such as mobile telephones.

A fundamental difference between lenses taught here and competing lens designs of the art can be found when considering its unusual nature that permits lens singlets to be stored in positions off the imaging axis. While the art is replete with collapsing lenses that telescope about a single common axis, those devices still have appreciable thickness in their storage modes. While suitable for some modest applications, they cannot be used where space constraints are the most severe.

The invention thus stands in contrast to methods and devices known previously.

OBJECTIVES OF THE INVENTION

It is a primary object of these inventions to provide for high performance imaging devices for applications having severely tight space constrained allocations.

It is an object of these inventions to provide mechanical means for switching a compound lens between an imaging mode and a storage mode.

It is a further object to provide mechanical systems having a plurality of coupled elements whereby counter rotational motions drive lens elements into prescribed arrangements.

It is an object of the invention to provide for very high performance imagers.

It is additionally an object to provide for lens system storage in severely constrained space allocations.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present inventions will become better understood with regard to the following description, appended claims and drawings where:

Figure 6:
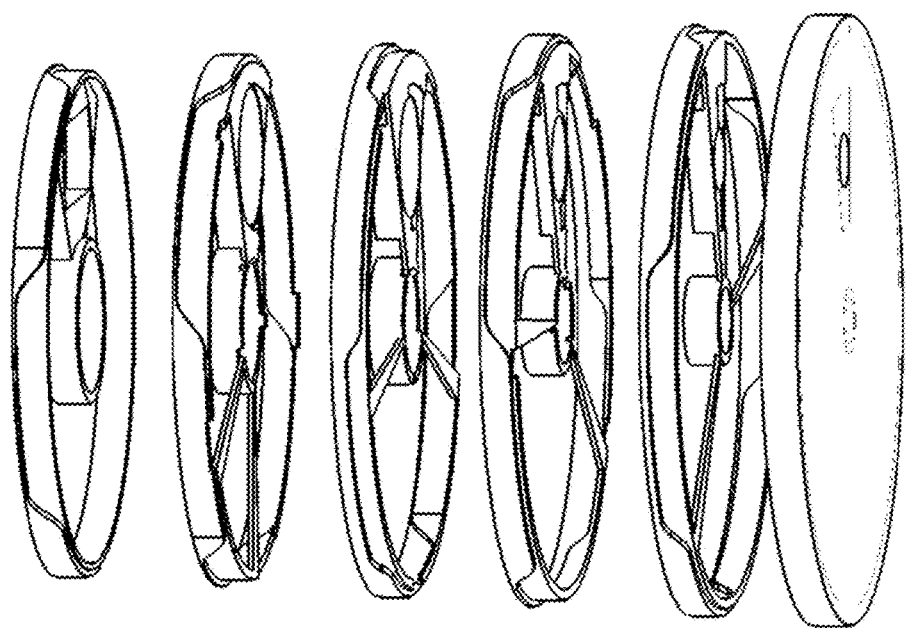
Figure 7:
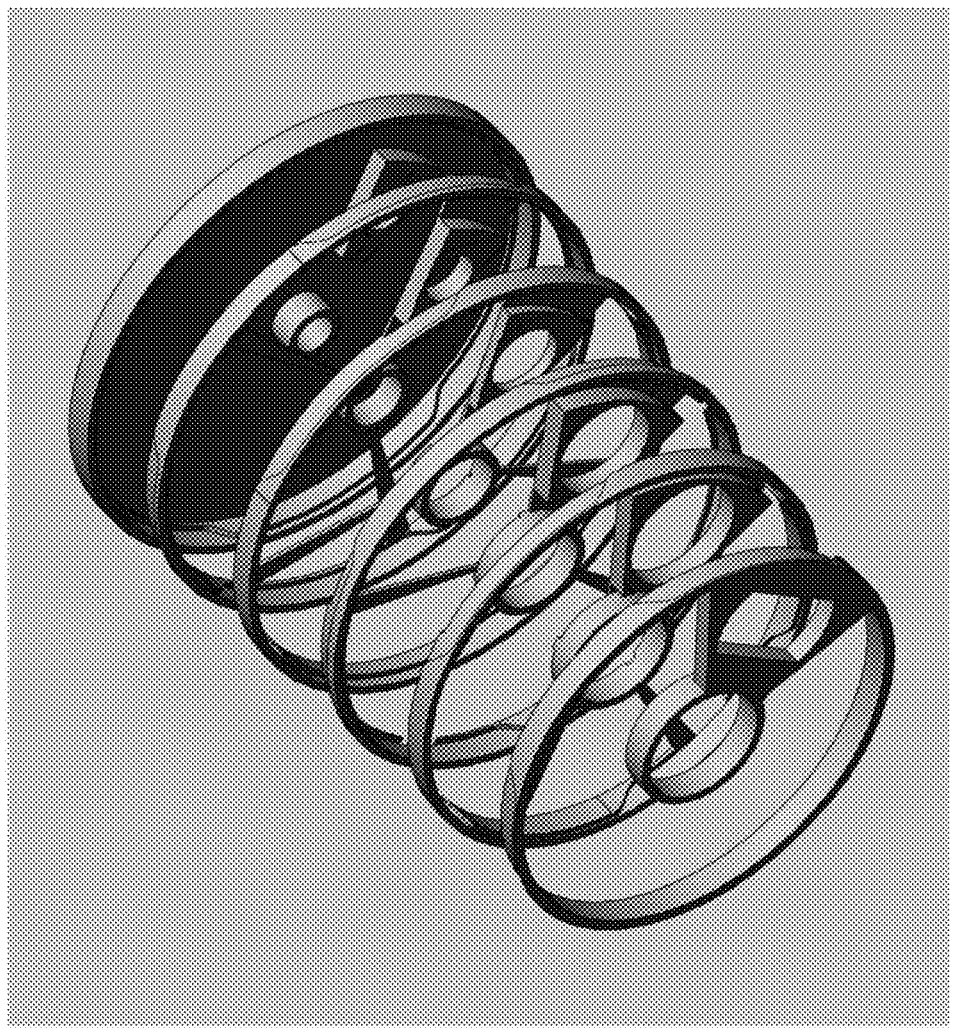
Figure 8:
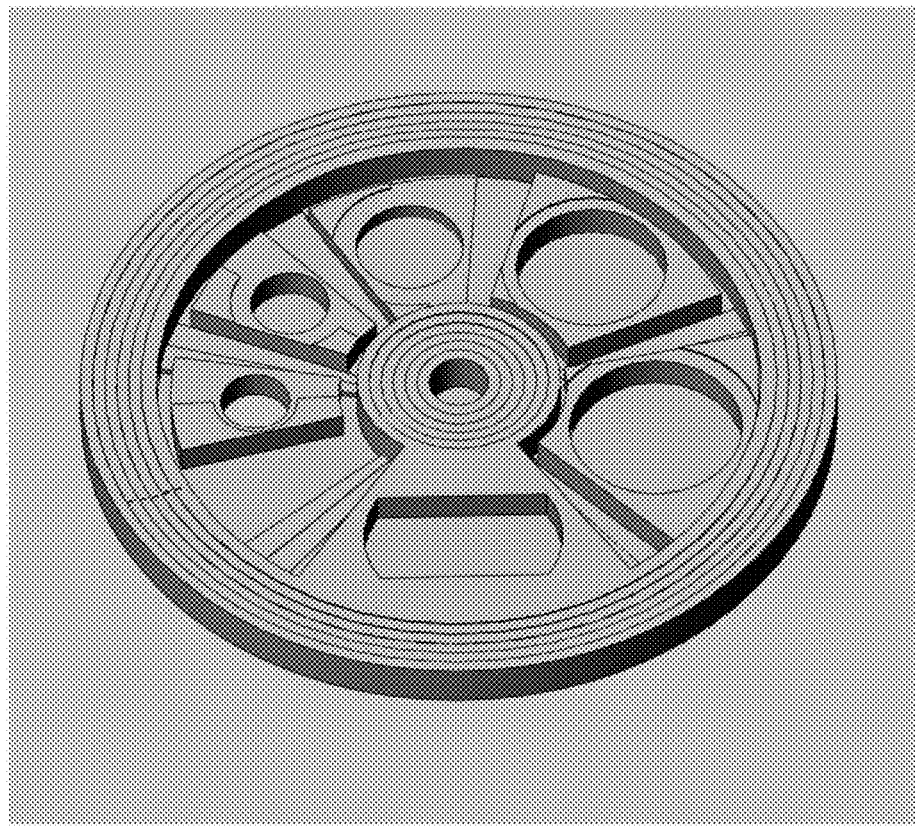
Figure 9:
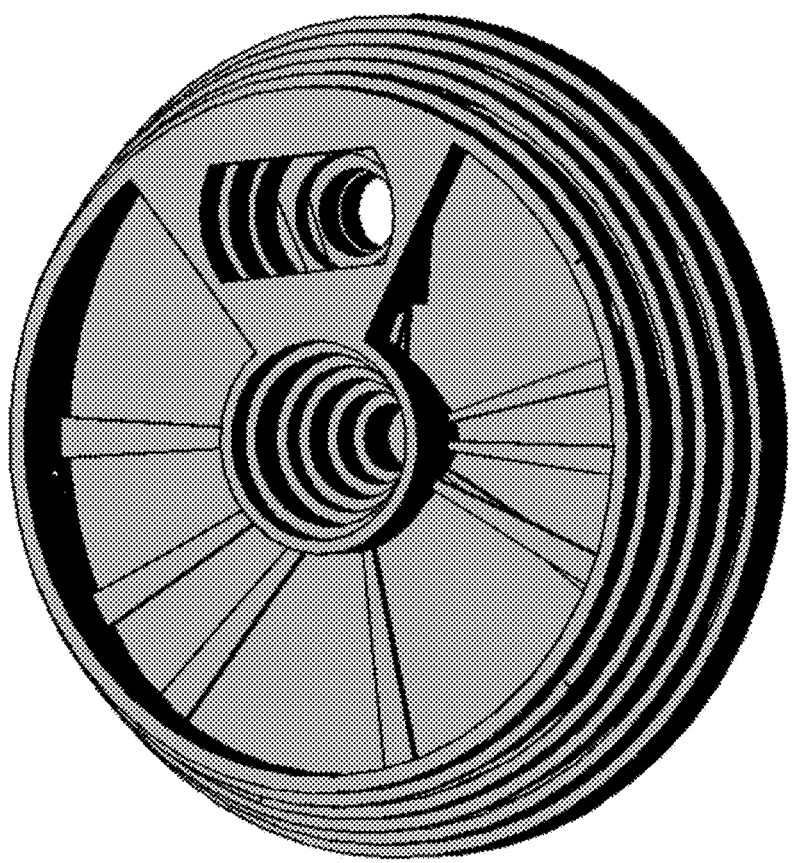

FIG. 6 similarly shows the cam systems of six related disk elements which together form an apparatus of these collapsible lens mount devices;

FIG. 7 is another exploded view having additional clarity;

FIG. 8 is a shaded representation of a preferred version showing additional clarity; and FIG. 9 illustrates the system in an alternative perspective.

DETAILED DESCRIPTION AND PREFERRED EMBODIMENTS

In accordance with each of preferred embodiments of the invention, dual mode lens mount systems are provided. Lens mount systems of these teachings include those having an imagine mode in one configuration and a storage mode in another configuration. It will be appreciated that each of the embodiments described include an apparatus and that the apparatus of one preferred embodiment may be different than the apparatus of another embodiment. Accordingly, limitations read in one example should not be carried forward and implicitly assumed to be part of an alternative example.

Collapsible lens systems presented herein are unique in that they cooperate particularly well in applications that demand a very thin profile when in a storage mode. Because special mechanical arrangements of interlocking parts permits a collapsing action that is characterized as helical or 'off-axis' a highly efficient high performance imaging means is realized. Individual lenses of a compound lens are not stacked together one on top of the other, but rather, are moved off the imaging axis and into a very thin planar volume.

The mechanical device supports translation between two modes including a storage mode and an imaging mode. When manipulated from one to the other mode, the device operates to rearrange lenslet elements so they cooperate together in support of the particular mode into which they are set. When imaging, the lenslets are all aligned on a common axis and with a prescribed spatial separation such that they form an excellent high quality image on an image plane detector. When placed into a storage mode, the mechanical system moves all lenslets into a thin planar volume distributed about. The thickness of the device in a storage mode may be approximately as thin as the thickest lenslet.

Because these arrangements are generally limited to systems having just a few lenslet elements, compound lenses are arranged in more simple configurations. While a compound lens of an advanced SLR camera may have 11 optical elements for example, these systems do not easily accommodate such large number of independent elements. Rather, preferred compound lenses of these systems have between about 2 and 6 lens elements. For example, one preferred compound lens arrangement that provide excellent image results and is only comprised of a 3 lens elements is known as a Cooke triplet.

This type of compound lens cooperates with the mechanical nature of these devices because of the limited number of elements, while at the same time providing very good imaging performance. Accordingly, these mechanical systems are best deployed when there are fewer than about 6 lenslet elements.

To accommodate lens elements, mechanical devices arranged as disks having a lens receiving space and lens mounting seat are provided. These disks are each further designed with regard to their mechanical cooperation with adjacent disks. Specifically, their peripheries may include a cam and cam following apparatus whereby the relative motion between them is very closely regulated to assure placement of the lenses held therein.

When several of these disks or 'frame' elements are coupled together, they hold lenslets in a fashion whereby they are translated between the two working modes of the system. Specifically, gentle tactile pressure from the force which may be applied by a user's finger causes the device to translate from one terminal position to the other.

While manual operation is sometimes preferred, it is fully anticipated that these systems may also be deployed as electrically driven mechanical translation devices as well. For clarity, the illustrative drawings hereafter do not include the complexities associated with an electrical drive system, however that is left as an engineering exercise with the understanding that such systems are included version of these inventions.

To illustrate most preferred versions, the reader is directed to the nine appended drawing figures with references. These are intended to be illustrative examples which show preferred versions and best modes. However, it will be understood that alternative version will be many and these will nevertheless gain the same advantages of an off axis collapsible lens system.

Figure 1:
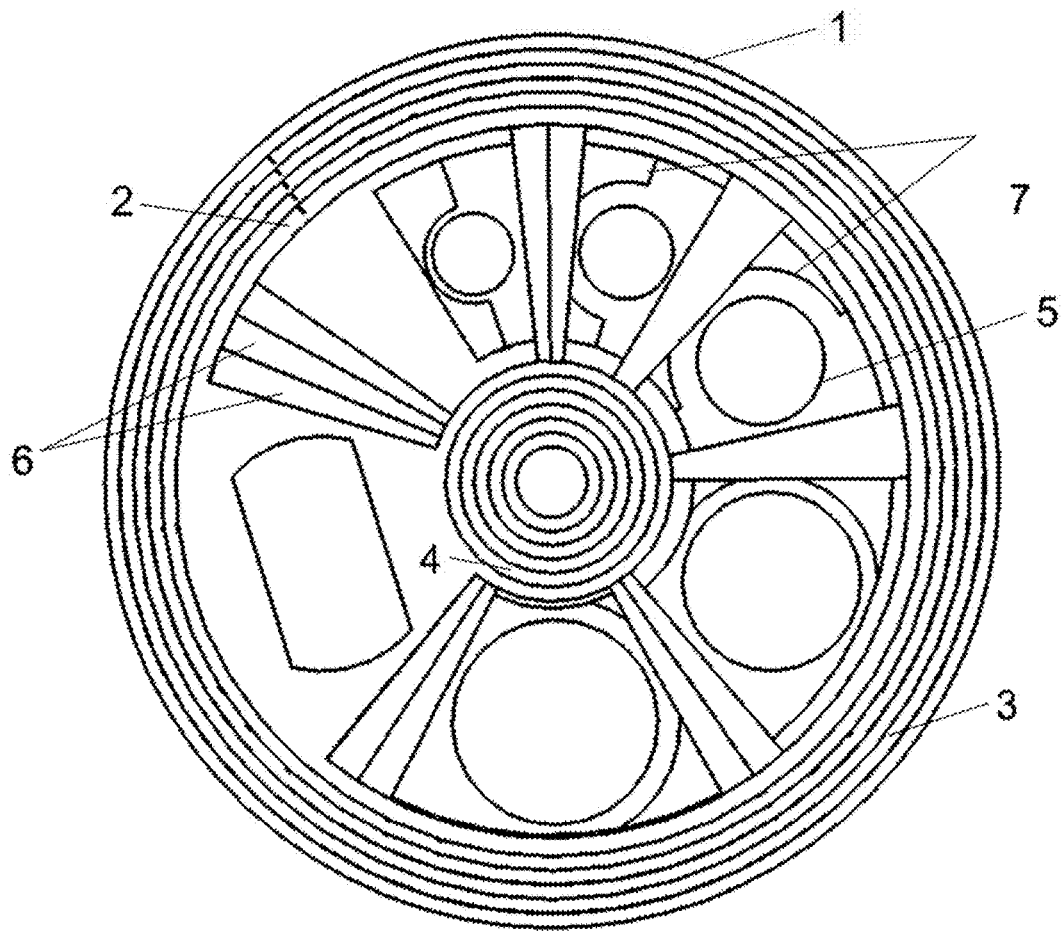
FIG. 1 is an axial view line drawing of six nested disk elements in a retracted mode.

FIG. 1 illustrates a first preferred version in which six nested disk elements lie mechanically coupled together to form a concentric arrangement which lies in a very thin substantially planar volume. When in this configuration, an outermost disk element 1 contains concentrically therein five additional disk elements of which includes an innermost disk element 2. Each disk is comprised of portions including a peripheral annulus 3 (second disk), a proximal or central annulus 4 (second disk), a lens seat 5 into which an optical singlet or double type lens element may be affixed and firmly held, radially extending support members or spokes 6, and an indexing or alignment grove 7.

The peripheral annulus of each disk element may be shaped as a cylindrical section having a thickness of a few millimeters or about the same thickness as the lens it is designed to carry. The annulus additionally has two primary surfaces including an external surface and internal surface. The normal from the external surface extends radially outward and the normal from the internal surface extends radially inward toward the system center. Into these surfaces of the annulus, formations such as surface reliefs may be provided as a cam and cam following system. A formation in agreement with this description may be set forth as having a raised portion, a ridge portion and a recess portion. These will be presented in greater detail hereafollowing.

Each disk element may additionally include a central annulus formed similarly. A central annulus is also characterized as a cylindrical section having at least two surfaces including an external surface and an internal surface. These surfaces may have formed therein a cam and cam following system of raised and recessed portions demarked by a ridge portion of particular shape and design.

Each disk element is intended to be coupled to at least one adjacent disk element both by proximity and via the cam system to form a sort of mechanical interlock that holds them together in good relation but slidably movable with respect to each other. For example, the interior surface of a peripheral annulus may have similar radius as the external surface of an adjacent disk element whereby a pressure fit permits them to move with respect to each other in a counter rotational sense but easily slide one within the other such that the cam systems of each drive motion in the axial direction. This is more readily understood in view of diagrams having more detail in a third dimension.

Figure 2:
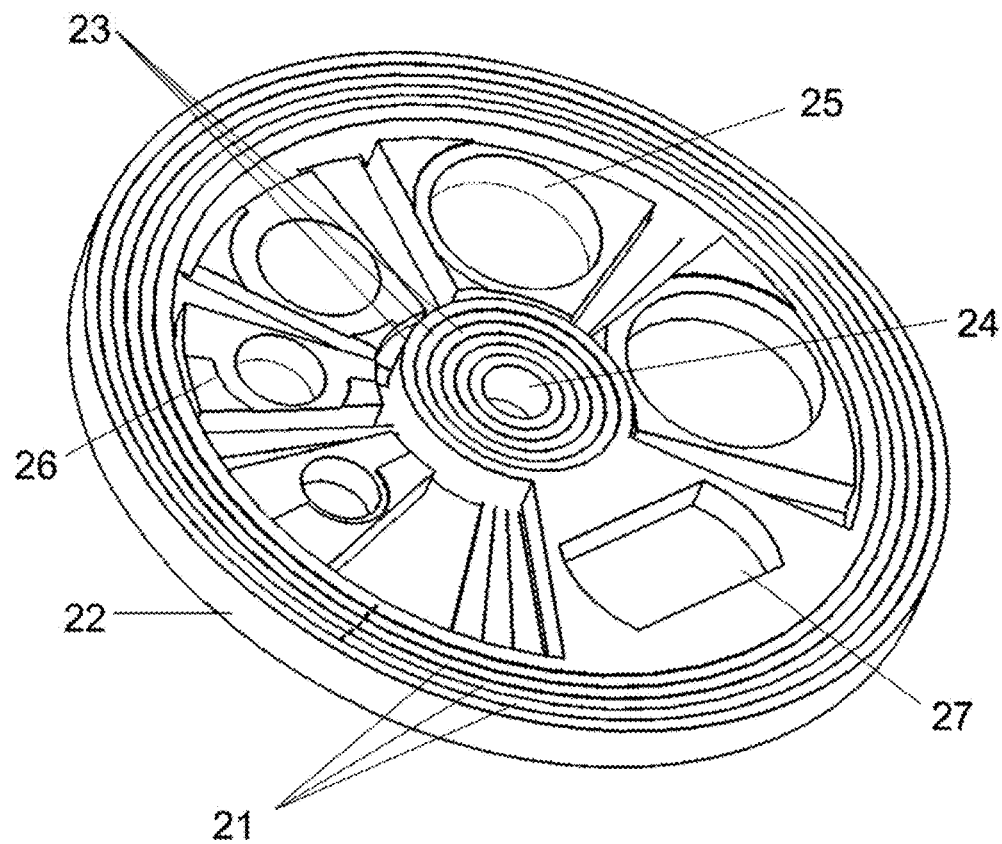
FIG. 2 is a perspective view of a nested disk elements in retracted mode.

FIG. 2 shows the apparatus in a perspective illustration which yields an indication of the depth of the device. Peripheral annuli 21 are shown as six rings nested one within the other. The external surface 22 of the outermost peripheral annulus may be smooth and without any cam system as that surface does not couple with any adjacent disk. A plurality of central annuli 23 each lie one within the other to form six concentric rings which lie about a system axis. The internal surface 24 of the innermost central annulus may be similarly smooth without any cam systems as this surface does not couple with any adjacent disk element. However, each of the other disk elements, e.g. disks 2-5, include both external and internal surfaces having a cam system formed thereon.

These disk elements additionally include a lenslet seat or lenslet holder receiving cavity into which an optical lenslet (either singlet or doublet) may be inserted and affixed. This lenslet seat may be formed as a 'pie wedge' shape extending from the central annulus to the peripheral annulus of a single disk element. A surface relief pattern 26 may additionally be provided as indexing means, to couple with a complementary index of an adjacent pie wedge when the system is expanded into an imaging mode.

While some versions include one lens per disk element, other alternative versions include disk elements allocated for use other than singlet lens mounting. For example, an electronic imaging detector may be accommodated in one of the disk elements. Alternatively, a simple shaped aperture 27 may be used in some versions to block undesirable light from entering the imaging system.

When these disk elements so arranged as described are counter rotated against each other, the cam systems on each of the annuli surfaces drive against each other or more particularly the immediate adjacent annulus to which it is coupled to cause the disk elements to rise and fall in the axial direction in a manner regulated by the cam shape and design. When rotated over its entire throw, the disk elements extend axially while simultaneously stacking the lens holder 'pie wedges' one on top of the other to cause all lenses held therein to come into alignment on a common optical or imaging axis. The optical axis is displaced from the system or disk rotational axis, but parallel thereto.

Figure 3:
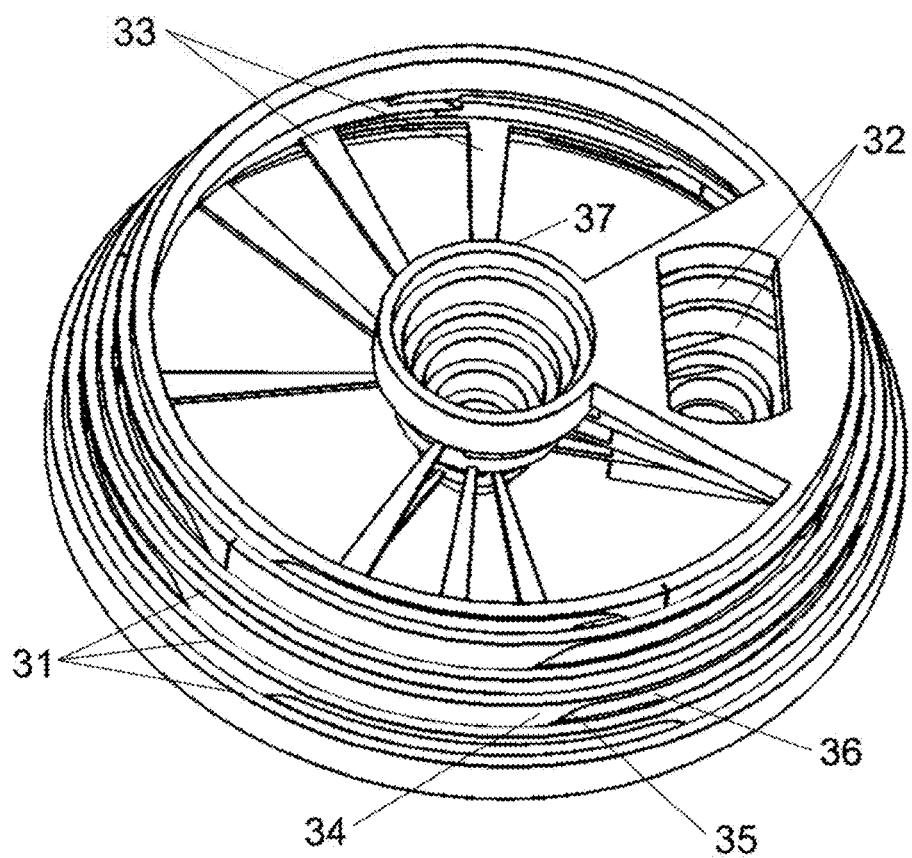
FIG. 3 is a perspective view of these disk elements in an imaging or expanded mode.

FIG. 3 illustrates. Peripheral annuli 31 having been rotated are forced to rise on ridges of adjacent cam systems resulting in respective displacements of the disk elements in the axial direction. Further, lens receiving cavities are aligned to form a lens stack that satisfies the imaging condition. Each lens either singlet or doublet held in each disk is aligned axially and spaced apart by a carefully prescribed amount to support the imaging condition of the compound lens. Spoke elements 33 provide for structural integrity between the central annuli and peripheral annuli.

Careful inspection of the external surfaces of disk element peripheral annuli reveal one important version of a cam system. A cam system may be formed of a raised portion 34, a ridge portion 35, and a recessed portion 36. When closely coupled with the cam system of the adjacent disk element, these surface relief features cause the disk to rise and fall relative to its neighbor in the axial direction as the respective disks are counter rotated against each other.

Figure 4:
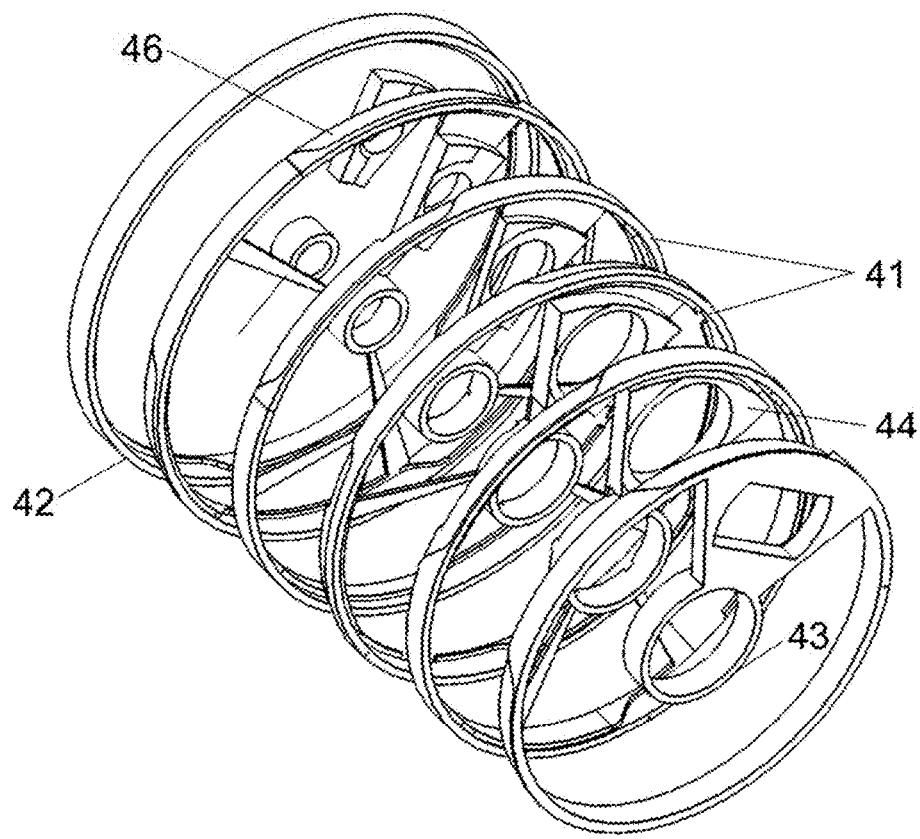
FIG. 4 is an exploded view of six disk elements slightly separated in an axial direction and decoupled each from the others in a non-operational arrangement.

The system can be more clearly understood in view of the diagram of FIG. 4 which is an exploded view showing the disk elements each spatially removed from the others in a configuration which is not operational. The exploded view affords opportunity to more clearly illustrate the nature of the disk elements 41 and the constituent parts from which they are comprised.

A mechanical system giving rise to a high performance compound lens having an imaging mode and a storage mode may be constructed oft plurality of six cooperating disk elements shown in FIG. 4. A disk element may be comprised of a peripheral annulus 42, a central annulus 43, a lens receiving space, a lens holder or lens seat 44, radially extending spoke elements 45, and a cam system 46 which couples a first disk element to a second adjacent disk element.

When assembled together, these disk elements operate in concert to bring about two operational modes including an imaging mode and a storage mode. In a storage mode, the disk elements are all collapsed together to lie in a thin planar volume (see FIG. 1.) whereby lenses held therein are distributed about and occupy a very thin space. In an imaging mode, the lenses are stacked on a single imaging axis and held in precise relation with each other to yield the imaging condition whereby a high resolution image is formed in an image plane having an electronic detector therein.

Figure 5:
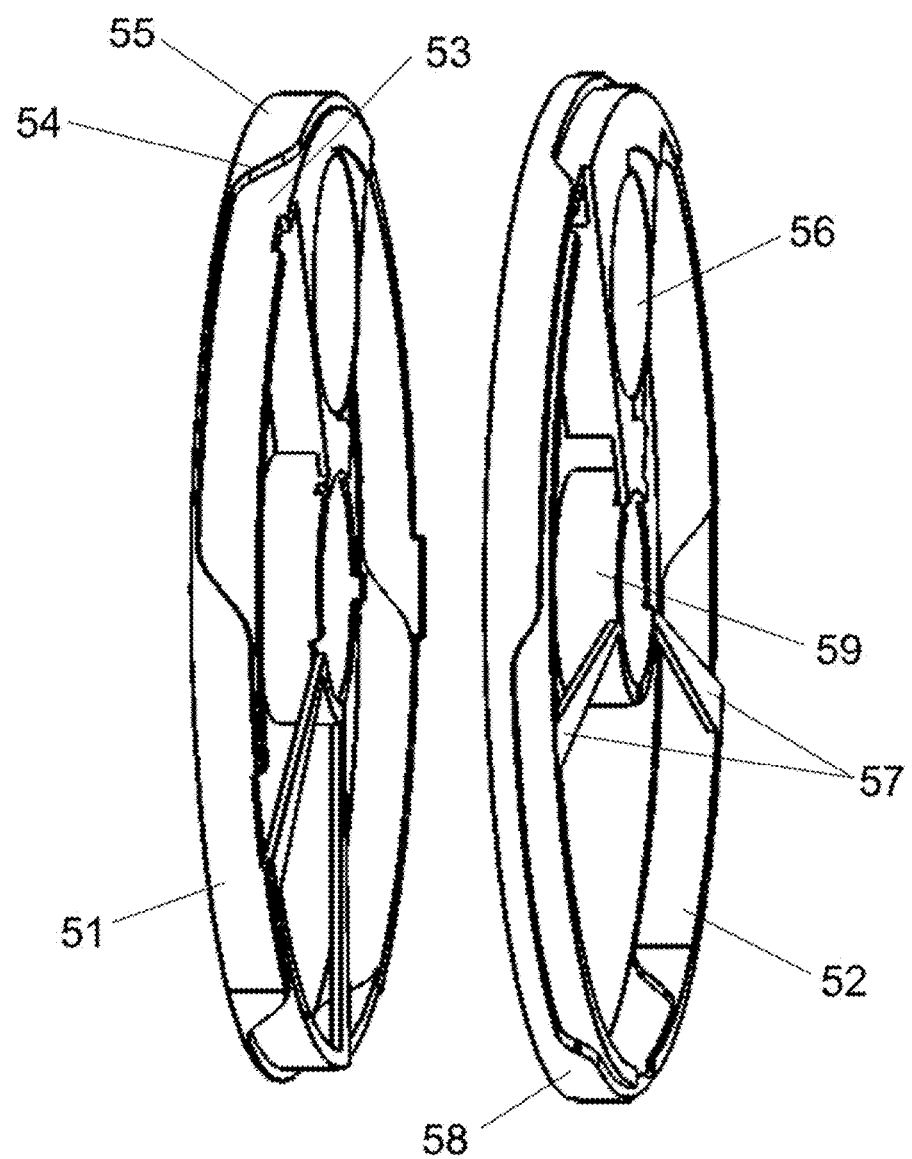
FIG. 5 illustrates in detail a cam system of a peripheral annulus both on an internal surface and on an external surface thereof.

The cam systems which are formed on the internal and external surfaces of annuli are more readily understood in view of the close-up diagram of FIG. 5 which shows illustrative version of same.

Two cooperating neighbor disk elements are shown including disk element 51 which fits into and couples with disk element 52. Particularly, a cam system of recesses 53, ridges 54 and raised portions 55. Lens receiving cavity 56 is formed in a 'pie wedge' portion of the disk element device. Spokes 57 connect the peripheral annular ring to the central annular ring 59. When the disks are pushed together they fit one within the other such that their respective cam systems drive against each other when the disks are rotated in relative opposing directions, one of them will rise in the axial direction and be linearly displaced. Further, the pie wedge shaped lens seat elements will come into alignment on top of the other to form a stack and optical alignment of a first lens held in the first disk element with a second lens in the second lens element.

The entire system may be comprised of six discrete disk elements as shown in the exploded view of FIG. 6. When pushed together, each of the disk elements fits into and couples with the cam system of its neighbor. Thus, rotations in one direction cause all six elements to expand in the axial direction and simultaneously align the lens holders on an optic axis to realize the imaging mode. Rotation in an opposing direction cause the disk elements to collapse one into the other until all lenses are distributed about and come to lie in a common planar volume making a very thin arrangement suitable for storage in a very confined space.

FIG. 7 includes shading to make the image more understandable. Six disk elements are arranged in an exploded view each separated from its neighbor for clarity. It is readily apparent that the disk element having the largest peripheral annulus also has the smallest central annulus. The disk element having the smallest peripheral annulus has the largest central annulus. In this way, each disk element can easily fit into the space made by the configuration of its neighbor and further support rotational motion between the cooperating devices.

FIG. 8 is a diagram with shading to show the apparatus in a storage mode whereby all the disk elements are collapsed into a thin planar volume, in this mode, all parts of the system including all six disk elements and the lenses held by them fit tightly within each other.

The operation mode characterized as the imaging mode is illustrated in the shaded diagram of FIG. 9. All lens receiving cavities are aligned on a single imaging axis and all annuli are displaced axially from its nearest neighbor to from an expansion in the axial direction.

One will now fully appreciate how collapsible lens systems may be achieved to realize most efficient space and weight savings while additionally supporting very high imaging fidelity. Although the present invention has been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

It is claimed:

1. Mechanical apparatus comprising: a plurality of disk elements coupled about a common axis,
   wherein relative rotational motion around the common axis between each disk element of the plurality of disk elements drives a prescribed positioning scheme,
   wherein the common axis does not coincide with an optical axis,
   wherein said disk elements are comprised of lens receiving, seats into which optical lenses are affixed and firmly mounted, and
   wherein each of said disk elements comprise a second annulus, and wherein the lens receiving seats reside outside of the second annulus.

2. Mechanical apparatus of claim 1, wherein said relative rotational motion is further characterized as counter rotation with respect to an immediately adjacent disk element.

3. Mechanical apparatus of claim 2, wherein each disk element of the plurality of disk elements further comprises a cam system disposed about a peripheral annulus.

4. Mechanical apparatus of claim 3, wherein the cam system of each disk element is spatially cooperative with the cam system of an adjacent coupled disk element of the plurality of disk elements.

5. Mechanical apparatus of claim 4, wherein the cam system of each disk element that is spatially cooperative with the cam system of the adjacent coupled disk element of the plurality of disk elements is arranged whereby counter rotational displacements with respect to the adjacent coupled disk element provides linear translation in the axial direction of the common axis.

6. Mechanical apparatus of claim 5, wherein said linear translation is the same as a thickness of a disk element.

7. Mechanical apparatus of claim 5, wherein said linear translation accompanied by counter rotation causes lenses of the respective disk elements to come into alignment on a common optic axis, wherein the lenses are not aligned on the common optic axes prior to said linear translation accompanied by counter rotation.

8. Mechanical apparatus of claim 5, wherein said linear translation accompanied by counter rotation causes lenses of respective disk elements to collapse side-by-side into a common plane.

9. Mechanical apparatus of claim 5, wherein said spatially cooperative cam system is further characterized as a formation on external and internal surfaces of disk annuli.

10. Mechanical apparatus of claim 9, wherein the formation on the external surface of a peripheral annulus is spatially cooperative with the formation on the interior surface of a peripheral annulus of an adjacent coupled disk element.

11. Mechanical apparatus of claim 4, wherein the annulus of a first disk element is characterized by having a peripheral annulus with an external surface having a radius substantially equal to the radius of an internal surface of a peripheral annulus of an adjacent disk element.

12. Mechanical apparatus of claim 1, wherein said central annuli are comprised of a cam system spatially cooperative with the cam system of the peripheral annulus.

* * * * *